United States Patent [19]

Kawamura et al.

[11] Patent Number: 4,727,436
[45] Date of Patent: Feb. 23, 1988

[54] METHOD AND APPARATUS FOR PRODUCING A PICTURE

[75] Inventors: Hideaki Kawamura, Tokyo; Nobuaki Sakurada, Yokohama; Yuichi Sato, Kawasaki; Yoshitaka Watanabe, Tokyo, all of Japan

[73] Assignee: Canon Kabushiki Kaisha, Tokyo, Japan

[21] Appl. No.: 946,096

[22] Filed: Dec. 23, 1986

Related U.S. Application Data

[63] Continuation of Ser. No. 801,501, Nov. 25, 1985, abandoned, which is a continuation of Ser. No. 526,532, Aug. 25, 1983, abandoned.

[30] Foreign Application Priority Data

Sep. 1, 1982 [JP] Japan ................. 57-152409

[51] Int. Cl.$^4$ .................. H04N 1/23; G01D 15/16
[52] U.S. Cl. ................... 358/298; 346/1.1; 346/140 R; 358/75
[58] Field of Search ............. 346/1.1, 140, 75; 358/75, 78, 283, 296, 298, 299

[56] References Cited

U.S. PATENT DOCUMENTS

| | | |
|---|---|---|
| Re. 27,555 | 1/1973 | Loughren ............... 346/75 X |
| 1,656,338 | 1/1928 | Ranger . |
| 1,790,723 | 2/1931 | Ranger ............... 358/283 X |
| 1,817,098 | 1/1931 | Ranger . |
| 3,197,558 | 7/1965 | Ernst . |
| 3,404,221 | 10/1968 | Loughren . |
| 3,681,650 | 8/1972 | Koll ............... 358/283 X |
| 3,683,212 | 8/1972 | Zoltan . |
| 3,739,084 | 6/1973 | Heinrich . |
| 3,747,120 | 7/1973 | Stemme . |
| 3,864,696 | 2/1975 | Fischbeck ............... 346/140 |
| 3,961,306 | 6/1976 | Anstey . |
| 3,977,007 | 8/1976 | Berry . |
| 4,050,077 | 9/1977 | Yamada et al. . |
| 4,108,654 | 8/1978 | Goren . |
| 4,178,597 | 12/1979 | Isayama ............... 346/75 |
| 4,272,771 | 6/1981 | Furukawa . |
| 4,300,142 | 11/1981 | Kos . |
| 4,313,684 | 2/1982 | Tazaki et al. . |
| 4,314,274 | 2/1982 | Atoji et al. . |
| 4,339,774 | 7/1982 | Temple . |
| 4,342,051 | 7/1982 | Suzuki . |
| 4,353,079 | 10/1982 | Kawanabe . |
| 4,365,275 | 12/1982 | Berman et al. . |
| 4,368,491 | 1/1983 | Saito . |
| 4,386,272 | 5/1983 | Check, Jr. et al. . |
| 4,389,712 | 6/1983 | Frattarola et al. . |
| 4,394,662 | 7/1983 | Yoshida et al. . |
| 4,394,693 | 7/1983 | Shirley . |
| 4,403,874 | 9/1983 | Payne ............... 358/78 X |
| 4,412,225 | 10/1983 | Yoshida et al. . |
| 4,412,226 | 10/1983 | Yoshida et al. . |
| 4,413,275 | 11/1983 | Horiuchi ............... 358/75 |
| 4,414,635 | 11/1983 | Gast et al. . |
| 4,431,319 | 2/1984 | Karaki et al. . |

(List continued on next page.)

FOREIGN PATENT DOCUMENTS

| | | |
|---|---|---|
| 52-11712 | 1/1977 | Japan . |
| 53-102034 | 9/1978 | Japan . |
| 57-156264 | 9/1982 | Japan . |
| 58-60878 | 1/1983 | Japan . |
| 58-212970 | 10/1983 | Japan . |
| 59-52658 | 3/1984 | Japan . |
| 59-41969 | 8/1984 | Japan . |

OTHER PUBLICATIONS

IBM Technical Disclosure Bulletin, vol. 21, No. 5, Oct. 1978.

Primary Examiner—Joseph W. Hartary
Attorney, Agent, or Firm—Fitzpatrick, Cella, Harper & Scinto

[57] ABSTRACT

For reproducing a picture with a density gradient through printing, an overlapped region is provided in a high density dot reproduction range and a low density dot reproduction range. The switch-over between the high density dot at the overlapped region is conducted where the picture density sharply changes. This reduces the unfavorable perception of quality differences in a printed picture resulting from the switch-over between the high and low density dots.

19 Claims, 16 Drawing Figures

U.S. PATENT DOCUMENTS

| | | |
|---|---|---|
| 4,438,453 | 3/1984 | Alston . |
| 4,446,470 | 5/1984 | Sugiyama et al. . |
| 4,468,706 | 8/1984 | Cahill . |
| 4,488,245 | 12/1984 | Dalke et al. . |
| 4,492,965 | 1/1985 | Ohnishi et al. . |
| 4,494,128 | 1/1985 | Vaught . |
| 4,499,479 | 2/1985 | Lee et al. . |
| 4,533,920 | 8/1985 | Suzuki . |
| 4,533,923 | 8/1985 | Suzuki ................................. 346/1.1 |
| 4,533,928 | 8/1985 | Sugiura et al. . |
| 4,547,812 | 10/1985 | Waller et al. . |
| 4,549,222 | 10/1985 | Fogaroli et al. . |
| 4,559,542 | 12/1985 | Mita . |
| 4,560,997 | 12/1985 | Sato et al. . |
| 4,580,150 | 4/1986 | Tazaki . |
| 4,595,948 | 1/1986 | Itoh et al. . |
| 4,604,654 | 8/1986 | Sakurada et al. . |
| 4,631,578 | 12/1986 | Sasaki et al. . |
| 4,635,078 | 1/1987 | Sakurada et al. . |

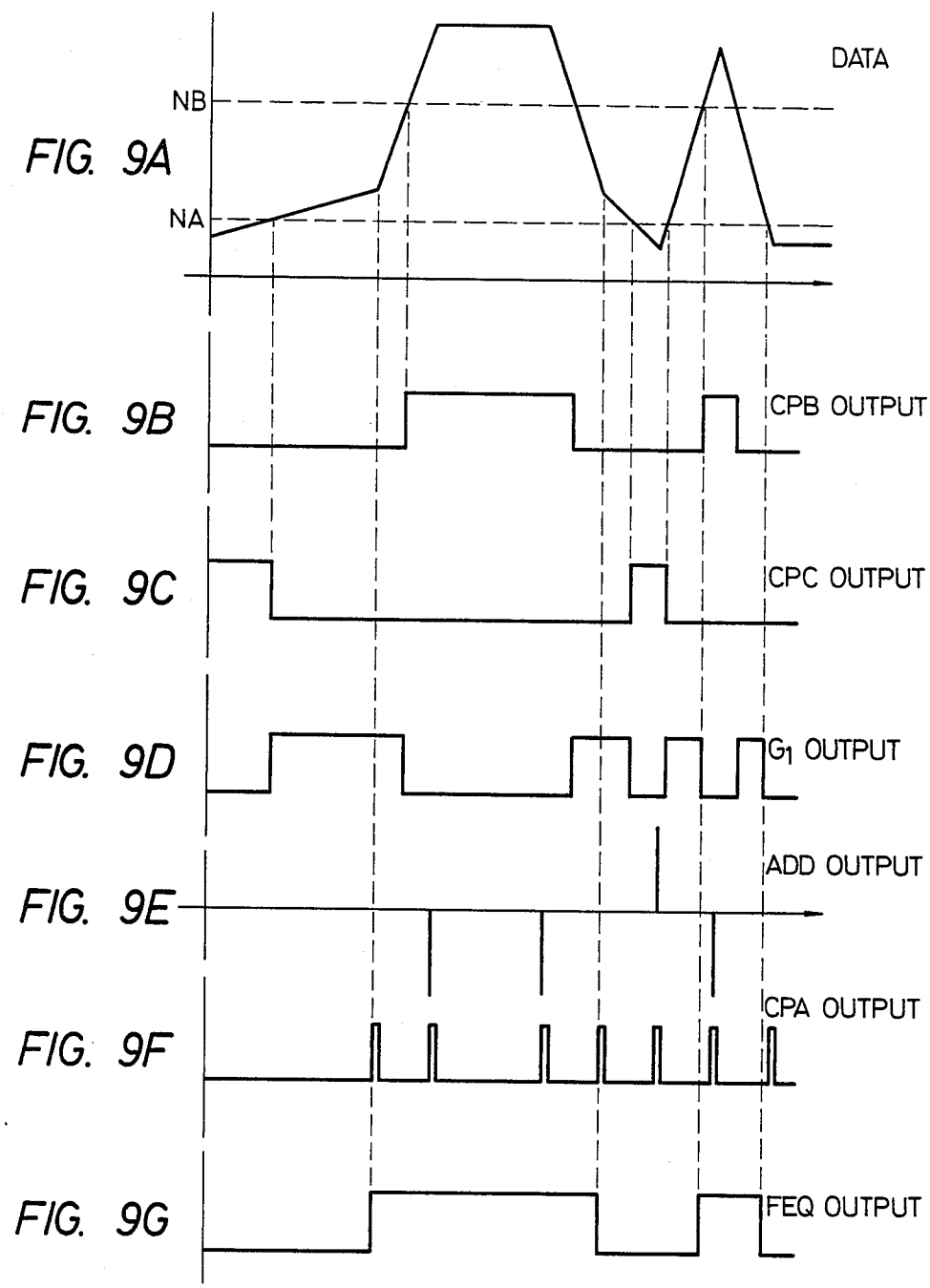

METHOD AND APPARATUS FOR PRODUCING A PICTURE

This application is a continuation of application Ser. No. 801,501 filed Nov. 25, 1985, now abandoned, which in turn is a continuation of U.S. Ser. No. 526,532, filed Aug. 25, 1983, now abandoned.

BACKGROUND OF THE INVENTION

1. Field of the Invention

This invention relates to a method and an apparatus for producing a picture by dots and, more particularly, to a method and an apparatus for producing a picture in which the reproduction of a density gradient is possible.

2. Description of the Prior Art

Although various kinds of apparatus which can reproduce density gradients have been conventionally proposed, the present invention will be described in detail hereinbelow with respect to an example of an ink jet printer.

The following methods of reproducing the density gradient have been proposed conventionally.

A first method is to reproduce the density gradient by varying the dot diameter size to be printed by controlling the quantity of liquid to be discharged from the ink jet head.

As a second method, the dot diameter is not changed but one picture element (i.e. pixel) is constituted by a 4×4 matrix consisting of, for example, micro-elements of and the density gradient is reproduced using a dither process for this matrix.

However, according to the first method, it is difficult to take a wide range from the minimum dot diameter to the maximum dot diameter and thus only the reproduction of the order of several density gradients can be done. Thus, this method is unsatisfactory for the print-out of television pictures or photographs, or the like.

The second method improves over in the first method, and if one pixel is represented by the matrix of 4×4, seventeen density gradients can be reproduced. However, an increase of one pixel by 16 times (4×4) than that in the first method causes the print speed to be reduced by 1/16, or the print speed must be made fast by increasing the number of print heads by 16 times. However, this countermeasure not only makes the construction of the print head complicated but also greatly increases the complexity of the electric circuit for processing pictures by means of the dither process, resulting in an extreme increase in overall cost.

DESCRIPTION OF RELATED APPLICATION

To eliminate such prior-art drawbacks, the present applicant has also proposed an ink jet printer which uses a plurality of inks with different tinting densities and can cover a wide density range with a simple construction by controlling the dot diameter with respect to each ink in U.S. Ser. No. 491,654, filed on May 5, 1983.

In such an ink jet printer, the diameter of the print dot which can be formed by the ink jet head is 70–280 $\mu$m when a certain type of head is used. To obtain a high density gradient by varying this dot size, the maximum dot diameter of about 200–280 $\mu$m is needed. If the overlapped area is set to be small, a pixel is constituted by 4–6 dots/mm (dot/mm is referred to as PEL hereinbelow). While, for example in a video printer which obtains reproduction pictures from television signals, the number of scanning lines of one frame of the television signal is 525 in case of NTSC system, so that the number of pixels is 525×(525×4/3) and the number of pixels in the effective screen among them is approximately 480×640 dots.

Therefore, when the screen is constituted by 5 PELs, the screen size becomes 96×128 mm, this size is suitable to appreciate at an ordinary least distance of distinct vision.

When a plurality of tinting density inks are used, two methods are available to obtain the same reflection density: a method of forming a small dot with an ink having a high tinting density; and a method of forming a large dot with an ink having a low tinting density. However, even if the reflection densities are identical, a large difference is perceived in the quality of such pictures when looked at.

When the dot is changed over between the high and low density inks at the portion where the density level of the picture signal to be recorded gradually changes, a continuous reflection density is secured; however, as described above, a distinct difference in picture quality can be perceived.

SUMMARY OF THE INVENTION

It is an object of the present invention to provide a method and an apparatus for producing a picture which can change the switching levels of the variable density dots in accordance with a change in density level of a recording picture signal in consideration of the above-mentioned points.

Another object of the present invention is to provide a method and an apparatus for producing a picture, in which an overlapped region is provided in both a reflection density region where a picture can be reproduced with concentrated (high density) dots and a reflection density region where a picture can be reproduced with rarefied (low density) dots, and in which both concentrated and rarefied dots are used in the overlapped regions.

Other objects and features of the present invention will be more apparent from the following detailed description taken in conjunction with the accompanying drawings.

BRIEF DESCRIPTION OF THE DRAWINGS

FIGS. 9A to 9G are signal waveform diagrams in each portion of FIG. 8.

DETAILED DESCRIPTION OF THE PREFERRED EMBODIMENT

Figure 1A:
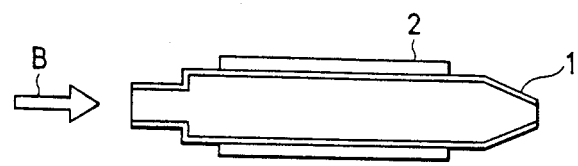
FIG. 1A is a cross sectional view of an ink jet head.
Figure 1B:
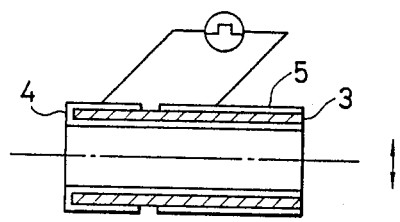
FIG. 1B is a cross sectional view of a piezovibrator.
Figure 2:
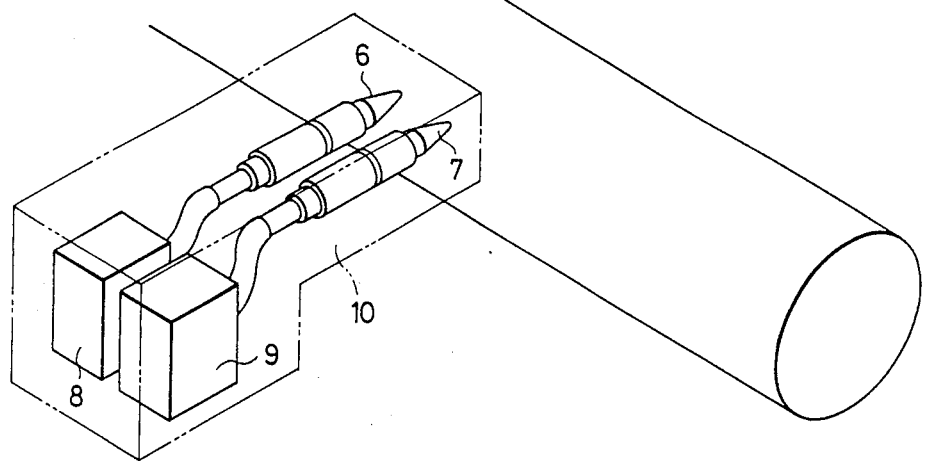
FIG. 2 is a constructional view of the ink jet head.
Figure 3:
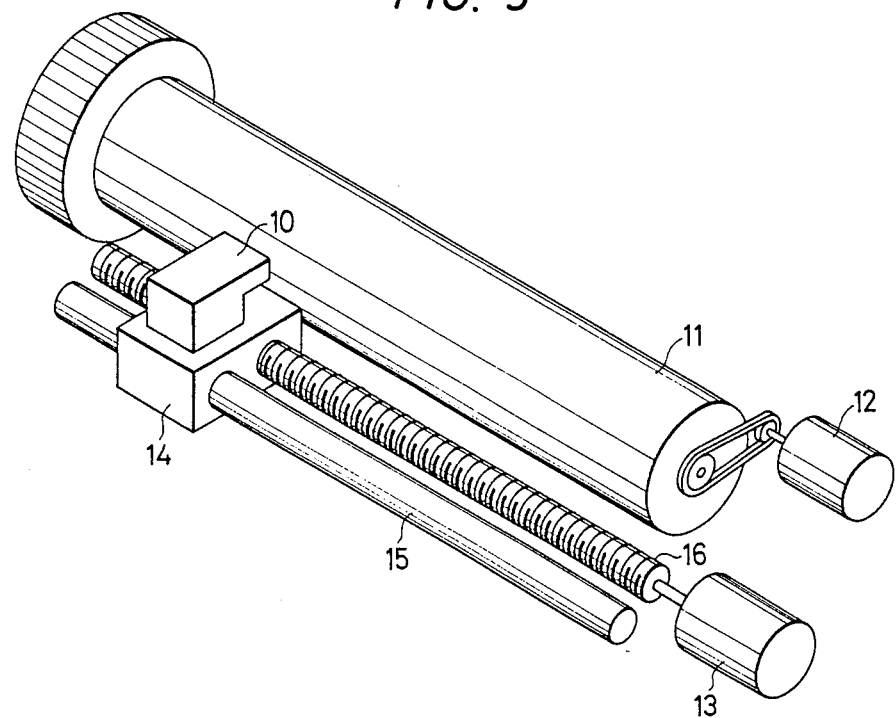
FIG. 3 is a perspective view of a printer to which the head of FIG. 2 was employed.

FIG. 1A is a cross sectional view of the ink jet head shown in this embodiment and FIG. 1B is a cross sectional view showing the construction of a piezovibrator. In the drawings, a glass tube 1 has an elongated point and a piezovibrator 2 coming into contact with the periphery of the glass tube 1. A reference numeral 3 denotes a tubular piezodevice and 4 and 5 indicate electrodes, respectively. A pulse-like voltage is applied between the electrodes 4 and thereby performing contraction and recovery of the tube in the direction of the inside diameter. At this time, by supplying ink from the direction indicated by an arrow B, it is possible to discharge an ink droplet from the elongated point (orifice portion) of the glass tube 1. The size of the discharged ink droplet can be changed in dependence upon the magnitude of the voltage to be applied to this piezodevice. According to our experiments, it was possible to change with respect to the width of about three times larger as the print dot diameter. However, the change in diameter of about three times larger results in about nine times the area ratio, and this is unsatisfactory to represent the density gradient as a picture printer. Therefore, as shown in FIG. 2, an ink jet head unit 10 is constructed which uses two heads 6 and 7 provided with ink tanks 8 and 9 in which inks with different densities (also referred to herein as "concentration") are contained, respectively. FIG. 3 is a constructional drawing of the mechanical section of a printer in which the head unit 10 shown in FIG. 2 was installed. In the drawing, a reference numeral 11 denotes a platen; 12 indicates a pulse motor to feed forms; 13 represents a motor to scan a head carriage 14 on which the head unit 10 was mounted by means of a guide 15 and a screw 16.

An example in the case where a picture was produced using the printer shown in FIGS. 2 and 3 is now described hereinbelow. An average reflection density OD in the following description is defined as follows by assuming that the amount of light incidence to be irradiated onto a predetermined area formed by the dots with 5 PEL pitch is $I_i$ and that the amount of reflected light for the amount of light incidence $I_i$ is $I_0$.

$$OD = \log_{10}(I_i/I_0)$$

In the following embodiment, Direct Blue 86 (color index) was used as ink.

Figure 4:
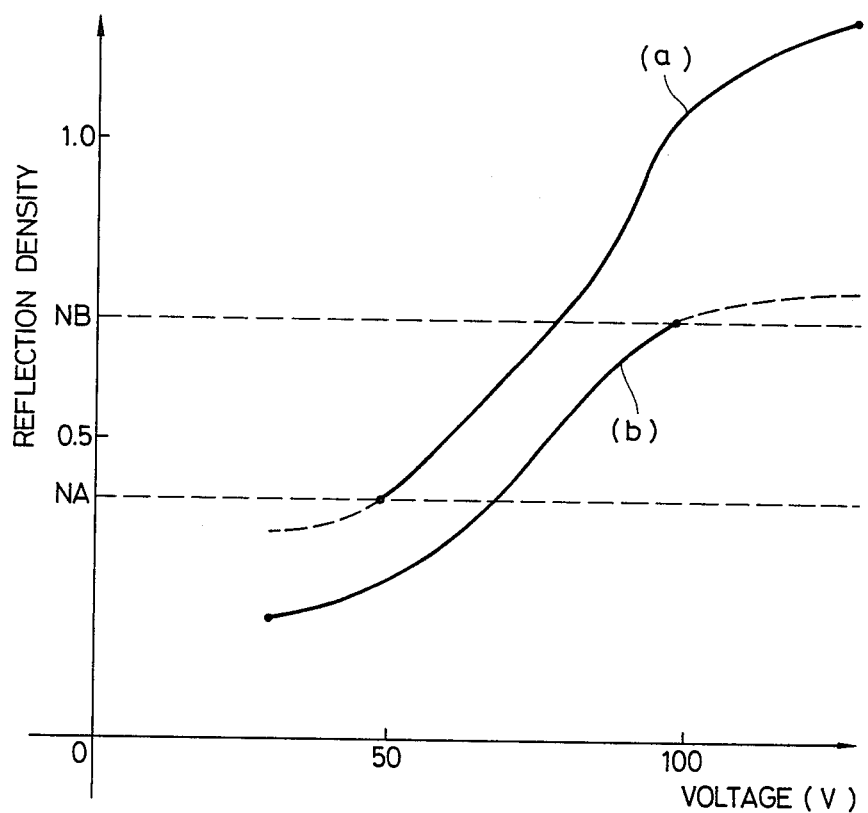
FIG. 4 is a graph showing the characteristics of the voltage applied to the head for the average reflection density.

FIG. 4 is a graph showing the relation between the voltage to be applied to the ink jet head and the reflection density. In this graph, a curve (a) indicates the characteristic of high density concentrated ink and a curve (b) represents the characteristic of low density rarefied ink. As will be obvious from the graph, the density representation is possible for a reflection density of 0.2–0.75 for the rarefied ink and for a reflection density of 0.35–1.2 for the concentrated ink, however, in this embodiment, a use range was defined such that the reflection density is between 0.2 and 0.7 for the rarefied ink and between 0.4 and 1.2 for the concentrated ink. Therefore, density NA−NB, i.e. the reflection densities are overlapped in the range of 0.4–0.7.

It is still another object of the present invention to advantageously make use of this overlapping region.

Figure 5:
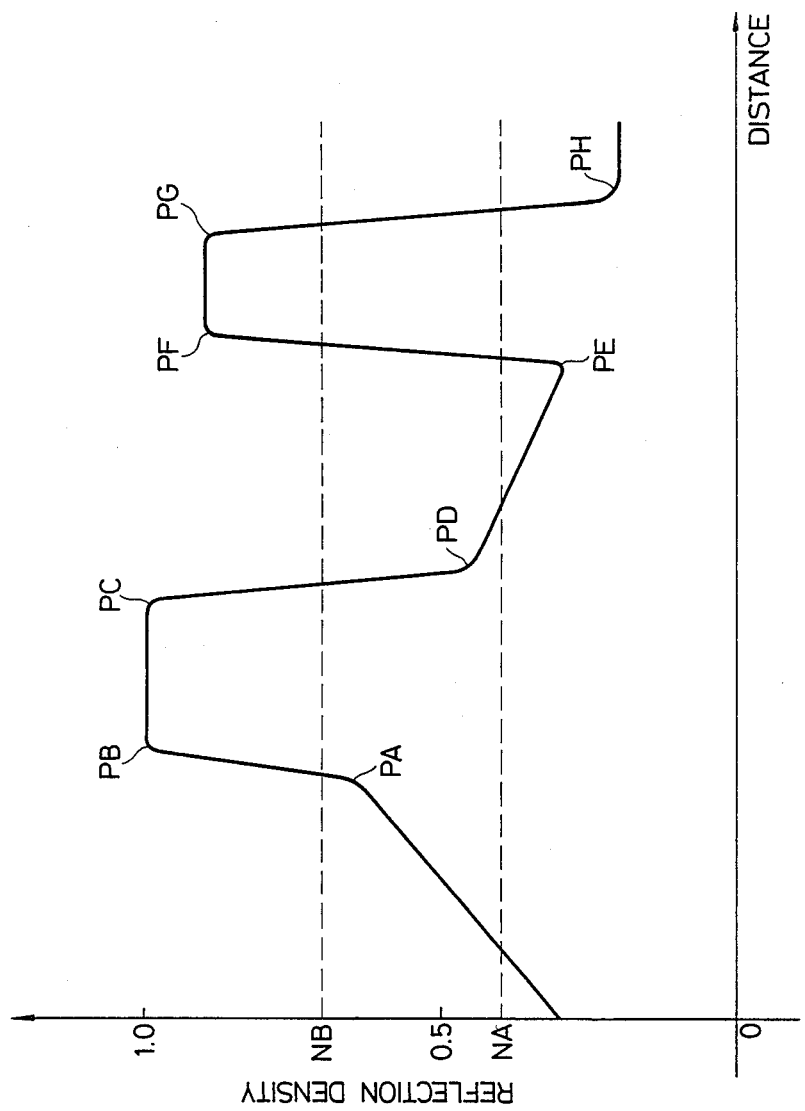
FIG. 5 is a graph showing an example of the change in density level of a picture to be generated.
Figure 6:
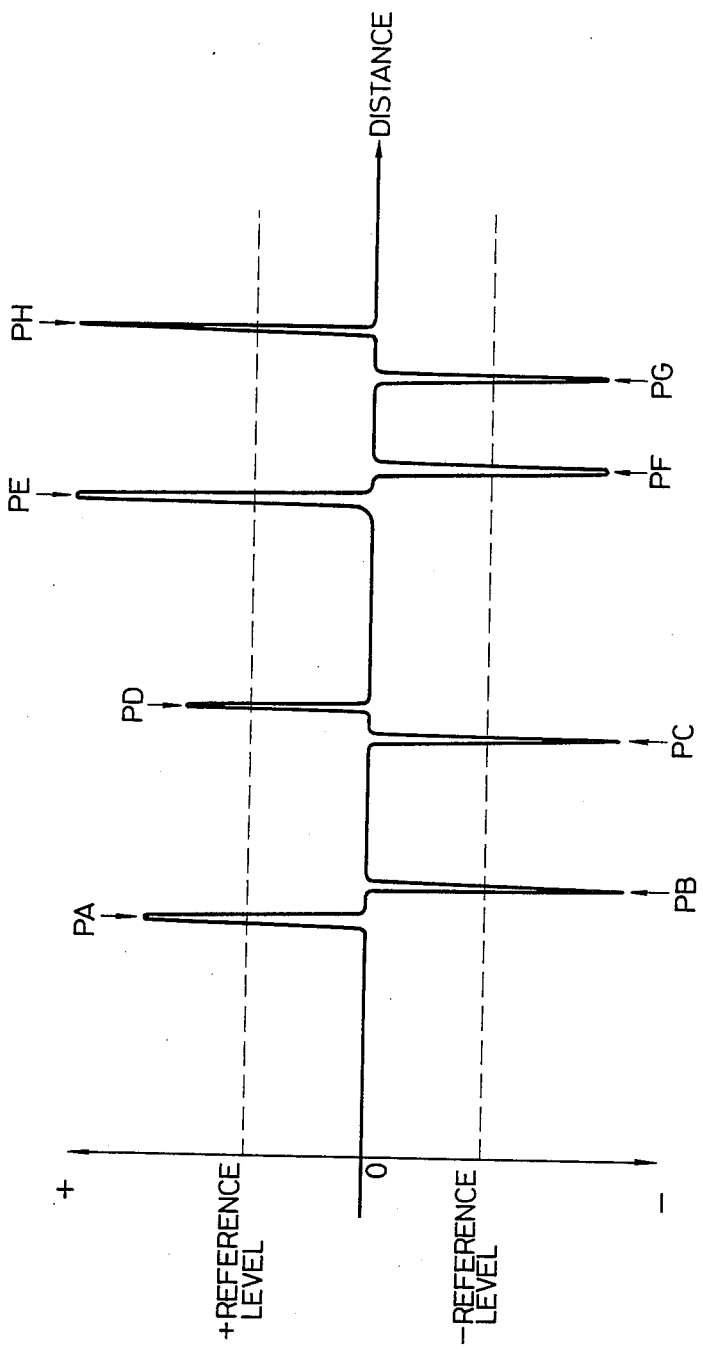
FIG. 6 is a waveform diagram of which the waveform of FIG. 5 was second-order differentiated.

The present embodiment is now simply described. For example, assuming that the density level of the picture to be output changes as shown in FIG. 5, points PA–PH in FIG. 5 indicate the rapid change points at which the density level suddenly changes. These rapid change points can be detected as a point of which a differential value exceeds the reference level when the signal indicative of the density level of the aforesaid picture is second-order differentiated (refer to FIG. 6).

By changing over between the low and high density dots at the point at which the density level suddenly changes, differences in the quality of the picture due to the difference between the concentrated dots and the rarefied dots need not cause concern because the rapid change in picture density distracts the viewer.

Figure 7:
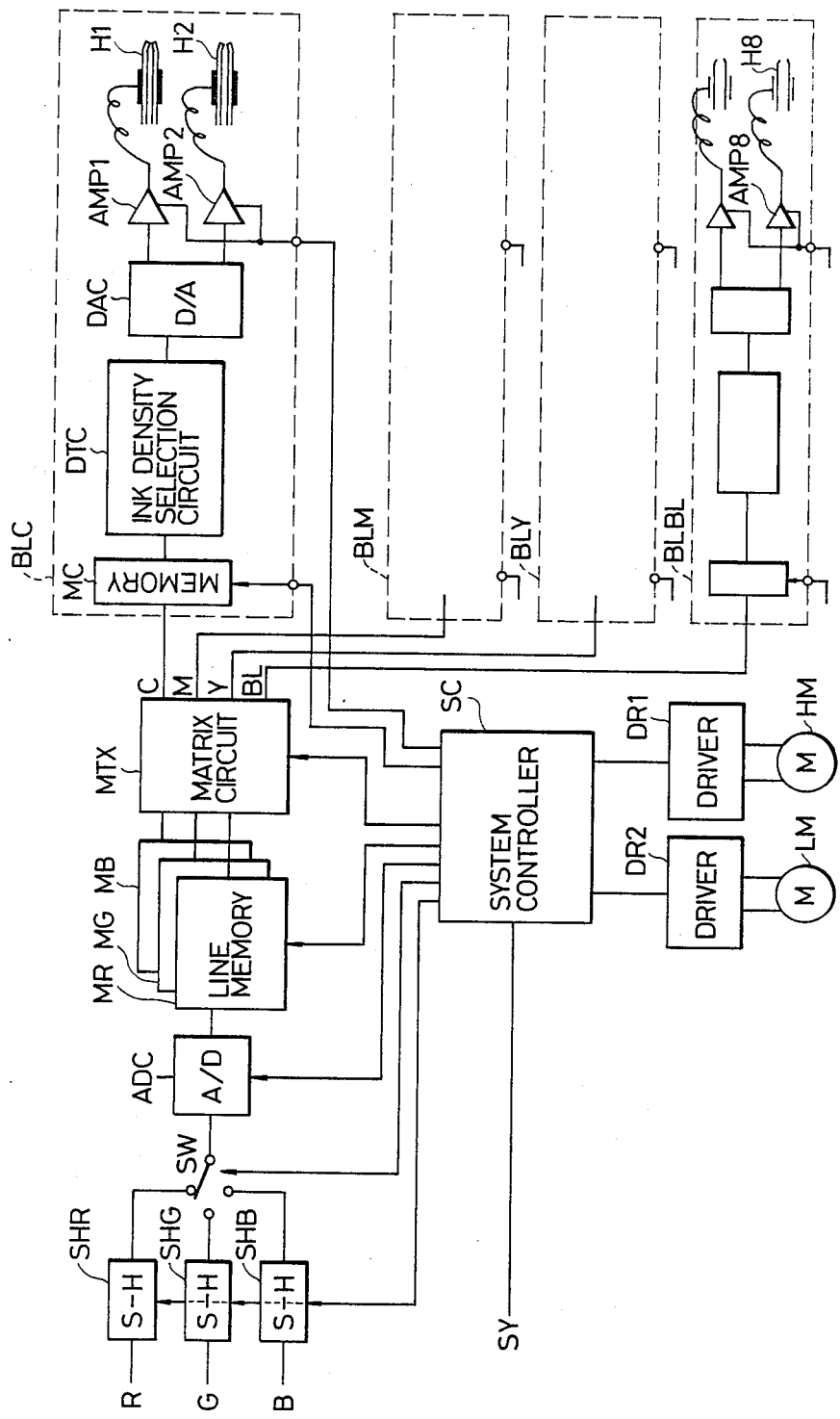
FIG. 7 is a control block diagram of a color printer in the present embodiment.

FIG. 7 shows a block diagram of an electric circuit when the present invention was applied to a color printer for printout of color video signals.

The picture signals from R, G and B are first respectively input to sample and hold circuits SHR, SHG and SHB. On the other hand, a sync signal SY is input to a system controller SC. The sampling and holding are preformed in accordance with the timing signals from this system controller SC, so that each color video signal is respectively stored in line memories MR, MG and MB through a signal change-over switch SW and an analog-digital converter ADC.

Then, a matrix circuit MTX carries out the masking and under color elimination processing on the basis of the information in the line memories MR, MG and MB to produce a cyan (also referred to as "cyanic") signal C, magenta signal M, yellow signal Y, and black signal BL. The operation with respect to only the cyanic signal C will be described hereinbelow; the other signals are also similarly processed. The cyanic signal C is stored in the memory MC. Next, the information in the memory MC is input to an ink density selection circuit DTC, where it is determined which one of the concentrated and rarefied inks is to be used to record.

Next, the voltages to be applied to ink jet heads H1 and H2 are determined in accordance with the selected ink and density information of the input picture. These voltage values are input to a digital-analog converter DAC and then applied to head drivers AMP1–AMP8. In the head drivers AMP1–AMP8, the timings to be applied to the ink jet heads H1 and H2 are controlled by the control signals from the system controller SC. The signals from the system controller SC are applied through drivers DR1 and DR2 to a head motor HM and a paper feeding motor LM, thereby controlling the head carriage and paper feeder, respectively.

Figure 8:
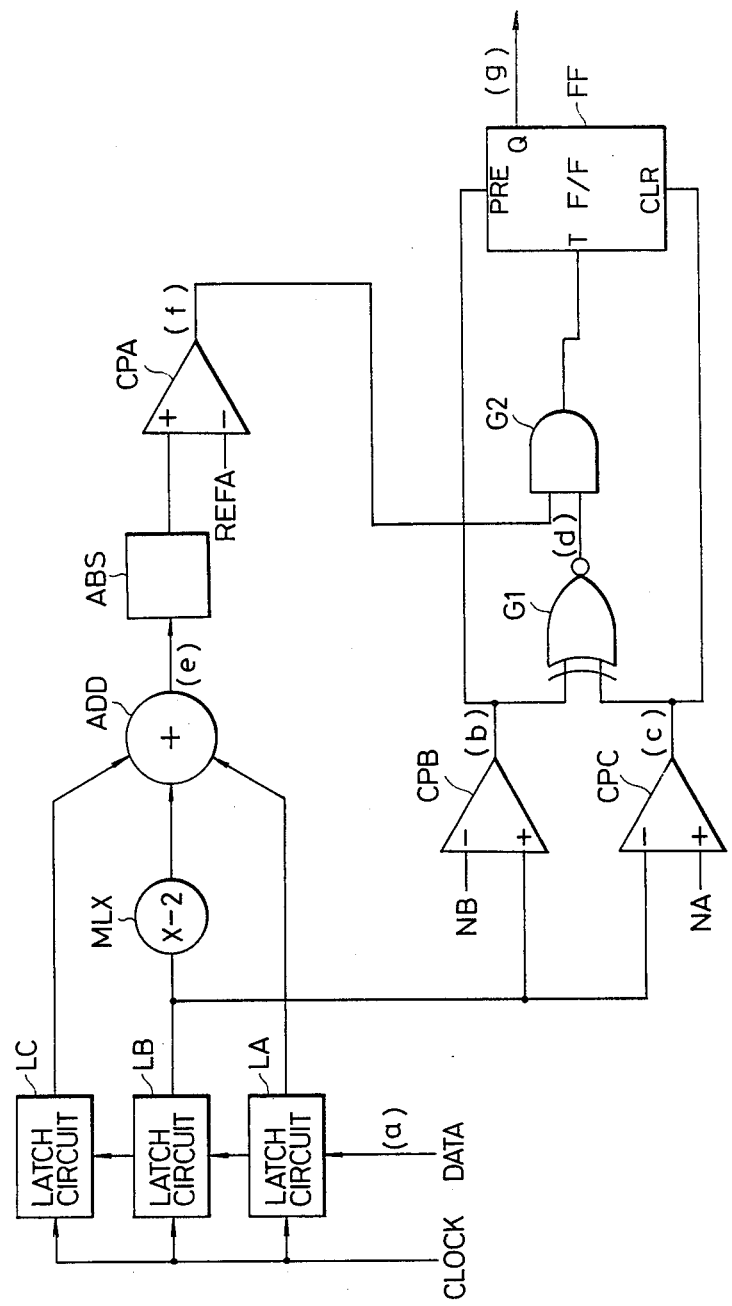
FIG. 8 is a detailed circuit diagram showing a part of the block of FIG. 7.

FIG. 8 is a detailed circuit diagram of a part of the ink density selection circuit DTC. FIGS. 9A–9G show waveforms of each section of FIG. 8. Although a cyanic block BLC will be described with reference to FIGS. 8 and 9A–9G, each block BLY, BLM and BLBL of yellow, magenta and black are similar to the block BLC.

Referring to FIG. 8, latch circuits LA, LB and LC serve to latch the density signals DATA of the picture to be recorded for a microperiod of time, and these signals are sequentially transferred to LA→LB→LC in response to clock signals CLOCK. Reference character MLX indicates a multiplier; ADD denotes an adder; ABS is an absolute value circuit; CPA, CPB and CPC are comparators; G1 and G2 are gate circuits; and FF shows a toggle flip flop, respectively.

The second-order differential can be approximated by calculus of differences as follows.

$$\frac{d^2x}{dt^2} = \frac{x_2 + x_0 - 2x_1}{\Delta t^2}$$

Wherein, Δt indicates a notched time and $x_0$, $x_1$ and $x_2$ represent densities per Δt. Assuming that Δt is constant, the second-order differential can be obtained by calculating $x_2+x_0-2x_1$ of the numerator. The operation of $x_2+x_0-2x_1$ is performed by the latch circuits LA, LB and LC, multiplier MLX and adder ADD. That is, the density signals DATA are transferred to LA→LB→LC by the clocks CLOCK generated at intervals of Δt; and $x_0$ is latched into LA, $x_1$ is latched into LB, and $x_2$ is latched into LC; then $x_1$ is multiplied by $-2$ in the multiplier MLX and input to the adder ADD, and the other two data are input thereto as they are, so that $x_2+x_1-2x_1$ is obtained.

Next, $|x_2+x_0-2x_1|$ is obtained by the absolute value circuit ABS, and this absolute value is detected by the comparator CPA whether it exceed the reference level or not. When an output of the CPA is at a higher level (hereinafter, referred to as "H"), this indicates a rapid change point at which the density signal suddenly changes.

The output of the latch circuit LB is also compared with the highest density level NB at which reproduction is possible with rarefied ink by the comparator CPB, and at the same time it is compared with the lowest density level NA at which reproduction is possible with concentrated ink by the comparator CPC. In case of a higher density than the level NB, an output (b) of the CPB becomes "H", and in case of a lower density than the level NA, an output (c) of the CPC becomes "H", and in case of an intermediate density between NA and NB, an output of the exclusive NOR gate G1 becomes "H". The output (b) of the CPB is input to a preset terminal PRE of the FF and the output (c) of the CPC is input to a clear terminal CLR of the FF. An AND output of an output (d) of the gate G1 and an output (f) of the CPA is input to a toggle input terminal T of the FF.

Namely, when the level of the density signal is over NB, a Q output (g) of the FF is set to "H", and in case of a lower level than NA, it is forcibly set to "L". In case of an intermediate level between NA and NB, i.e. in the region where the reflection density of each picture which can be produced by the concentrated and rarefied inks overlaps, the Q output (g) of the FF is changed from "L" to "H" or from "H" to "L" at the location where the density suddenly changes.

The Q output (g) of the FF is used as a head selection signal to control the switching between the head H1 for concentrated ink and the head H2 for rarefied ink. Namely, when the Q output (g) is "H", the head H1 for concentrated ink is selected and when it is "L", the head H2 for rarefied ink is selected. The ink density selection circuit DTC is provided with a conversion table on the basis of the reflection density-voltage characteristics of FIG. 4. The digital value of the voltage applied to the head is output to the DA converter DAC and the output voltages of the DAC are amplified by the amplifiers AMP1 and AMP2 and then applied to the head H1 and H2. The print dot diameters change according to the voltages to be applied to the heads H1 and H2.

In this way, the switching control of the ink density heads and the control of the voltage to be applied to the heads with respect to cyan or cyanogen have been described; other magenta, yellow and black are similarly controlled. In the case where the recording positions by each head are separated, the recording can be preformed by adjusting the timing signals by which the matrix circuit, memory circuit and ink density selection circuit are controlled.

Although, in this embodiment, the switching control of the ink density head is done by the discrete circuit, it may be possible to construct by software using a computer.

Although, in this embodiment, the portion where the density level largely changes was digitally detected using calculus of differences, in case of analog signals, a second-order differentiated waveform is obtained by providing two stages of differential circuits and the above-mentioned detection may be done on the basis of the determination of whether the waveform is over the reference level or not. In addition, it is possible to detect whether the density level largely changes or not by the first-order differential; therefore, there is no problem even if the detection is made in accordance with the first-order differential as well as the second-order differential.

As described above, according to the present invention, pictures are produced by the variable density dots and the selection of the variable density dots is performed at the portion where the density level of the picture signal to be recorded largely changes; therefore, it is possible not only to get a wide density gradient width but also to obtain the pictures with high quality since the difference in quality sense of the portions produced with the concentrated dots and with the rarefied dots is not conspicuous under the sudden change in density.

Although the example of the ink jet printer has been described in this specification, the present invention is not limited to this but can be applied to any dot printer that can reproduce various densities, such as an electrophotographical printer, electrostatic printer, thermal printer, etc.

It is needless to say that the present invention can be applied to a recording method and an apparatus therefore which are set forth in, for example, the specification of U.S. Pat. No. 3,946,398, DE Laid-open official Gazette No. 2843064, or U.S. Pat. No. 4,330,787. Although the circular dots used, the dot shape is not limited to this and the present invention can be applied to any dots having various shapes.

Although, in this embodiment, the example using two kinds of concentrated and rarefied dots has been explained, it may be possible to use the dots having three or more kinds of different densities.

Although the present invention has been shown and described with respect to a particular embodiment, various changes and modifications which are obvious to a person skilled in the art to which the invention pertains are deemed to lie within the spirit and scope of the invention.

What we claim is:

1. A method of producing a picture comprising a pictorial color image having areas of different light-reflecting properties which provide different optical reflection densities, the method comprising:
    providing dots having a plurality of optical reflection densities for representing areas of the picture having corresponding optical reflection densities;
    using a first kind of dot with a first concentration for representing areas of the picture having optical reflection densities less than an upper level;
    using a second kind of dot with a second concentration higher than said first concentration for representing areas of the picture having optical reflection densities greater than a lower level below said upper level; and changing over between said first and second kinds of dots in a region of the picture that has an optical reflection density between said upper and lower levels, wherein said change-over is conducted by detecting a sharp change in the optical reflection density of the picture.

2. A method according to claim 1, wherein the picture is produced by the first kind of dots in the portions thereof having a lower optical reflection density than said lower level.

3. A method according to claim 1, wherein the picture is produced by the second kind of dots in the portions thereof having a higher optical reflection density than said upper level.

4. A method according to claim 1, wherein said detection is made by differentiating a signal representing the optical reflection density level of the picture.

5. A method according to claim 1, wherein said dots are provided by ink droplets discharged from an ink jet head corresponding to each kind of dot and the optical reflection densities of the dots are varied by changing the size of the ink droplets.

6. A method according to claim 1, wherein said dots have a plurality of colors, with respect to at least one color among said plurality of colors a plurality of optical reflection densities is used to form the picture.

7. A method according to claim 6, wherein said dots are provided in four colors of cyan, magenta, yellow, and black.

8. A method of producing a picture comprising a pictorial color image having areas of different light-reflecting properties which provide different optical reflection densities, the method comprising the steps of:

providing dots having a plurality of optical reflection densities for representing areas of the picture having corresponding optical reflection densities;

setting a density overlapping region wherein the optical reflection densities of the picture can be represented by at least two kinds of dots having high and low concentrations that provide ranges of optical reflection densities that overlap with each other;

producing areas of the picture by using said low concentration dots when the area has a lower optical reflection density level than the lower limit of said density overlapping region;

producing areas of the picture by using said high concentration dots when the area has a higher optical reflection density level than the upper limit of said density overlapping region;

producing areas of the picture using one of either said high or low concentration dots when the area has an intermediate optical reflection density level within said density overlapping region; and changing over between using high concentration dots and low concentration dots when the optical reflection density level sharply changes in said density overlapping region.

9. A method according to claim 8, wherein said change-over step is conducted by detecting the portion where the optical reflection density level of the picture sharply changes.

10. A method according to claim 9, wherein said detection is made by differentiating a signal representing the optical reflection density level of the picture.

11. A method according to claim 8, wherein said dots are provided by ink droplets discharged from an ink jet head corresponding to each kind of dot and the optical reflection densities of the dots are varied by changing the size of the ink droplets.

12. A method according to claim 8, wherein said dots have a plurality of colors, with respect to at least one color among said plurality of colors a plurality of optical reflection densities is used to form the picture.

13. A method according to claim 12, wherein said dots are provided in four colors of cyan, magenta, yellow, and black.

14. Apparatus for producing a picture comprising a pictorial color image having areas of different light-reflecting properties which provide different optical reflection densities, the apparatus comprising:

means for providing dots having a plurality of optical reflection densities for representing areas of the picture having corresponding optical reflection densities by using at least two kinds of dots with different concentrations;

means for detecting regions of the picture having an intermediate optical reflection density between two levels and areas of the picture in the regions wherein the optical reflection density changes at least by a predetermined amount from one area to an adjacent area; and means for controlling said dot-providing means to change over from one said kind of dot to another said kind of dot in response to said detecting means.

15. Apparatus according to claim 14, wherein said detection means detects the where the density optical reflection level sharply changes by differentiating a density signal representing the optical reflection density level of the picture.

16. Apparatus according to claim 14 wherein said dot-producing means includes an ink jet head corresponding to each kind of dot for discharging ink droplets of different sizes to vary the optical reflection densities of the dots.

17. Apparatus according to claim 14, wherein said dot-producing means forms dots having a plurality of colors.

18. Apparatus according to claim 17, wherein said dot-producing means forms dots of cyan, magenta, yellow, and black.

19. Apparatus for producing a picture having areas of different light-reflecting properties which provide different optical reflection densities, the apparatus comprising:

means for providing dots having a plurality of optical reflection densities for representing areas of the picture having corresponding optical reflection densities by using at least two kinds of dots with different concentrations;

means for detecting regions of the picture having an intermediate optical reflection density between two levels and areas of the picture in the regions wherein the optical reflection density changes at least by a predetermined amount from one area to an adjacent area, wherein said detection means detects said areas by second-order differentiating a density signal representing the optical reflection density level of the picture and by comparing the second-order differential value with a predetermined value to detect where the optical reflection density level of the picture sharply changes; and means for controlling said dot-providing means to change over from one said kind of dot to another said kind of dot in response to said detecting means.

* * * * *

UNITED STATES PATENT AND TRADEMARK OFFICE
CERTIFICATE OF CORRECTION

PATENT NO. : 4,727,436

DATED : February 23, 1988

INVENTOR(S) : HIDEAKI KAWAMURA, ET AL.

It is certified that error appears in the above-identified patent and that said Letters Patent is hereby corrected as shown below:

COLUMN 1

Line 31, "of" should be deleted.
    Line 39, "in" should be deleted.

COLUMN 3

Line 7, "and thereby" should read --and 5, thereby--.

COLUMN 5

Line 13, "$x_2+x_1-2x_1$" should read --$x_2+x_0-2x_1$--.
    Line 59, "head" should read --heads--.
    Line 65, "other" should read --other heads for--.
    Line 67, "pre-" should read --per- --.

COLUMN 6

Line 39, "fore" should read --for--.
    Line 42, "used," should read --are used,--.

UNITED STATES PATENT AND TRADEMARK OFFICE
CERTIFICATE OF CORRECTION

PATENT NO. : 4,727,436

DATED : February 23, 1988

INVENTOR(S) : HIDEAKI KAWAMURA, ET AL.

It is certified that error appears in the above-identified patent and that said Letters Patent is hereby corrected as shown below:

<u>COLUMN 8</u>

Line 29, "the where" should read --the portion where--.
    Line 33, "claim 14" should read --claim 14,--.

Signed and Sealed this

Sixteenth Day of August, 1988

Attest:

DONALD J. QUIGG

Attesting Officer

Commissioner of Patents and Trademarks